United States Patent [19]
Kirkpatrick

[11] Patent Number: 5,703,575
[45] Date of Patent: Dec. 30, 1997

[54] OPEN SENSOR DIAGNOSTIC SYSTEM FOR TEMPERATURE TRANSMITTER IN A PROCESS CONTROL SYSTEM

[75] Inventor: William R. Kirkpatrick, Faribault, Minn.

[73] Assignee: Rosemount Inc., Eden Prairie, Minn.

[21] Appl. No.: 720,214

[22] Filed: Sep. 26, 1996

Related U.S. Application Data

[63] Continuation of Ser. No. 465,684, Jun. 6, 1995, abandoned.

[51] Int. Cl.⁶ ................................................ G08C 19/12
[52] U.S. Cl. .................. 340/870.17; 340/584; 340/652; 340/653
[58] Field of Search ............... 340/870.17, 870.16, 340/870.04, 870.05, 870.01, 584, 650, 651, 652, 653; 324/511, 522, 537, 538; 374/163, 166, 170

[56] References Cited

U.S. PATENT DOCUMENTS

| | | |
|---|---|---|
| 3,872,389 | 3/1975 | Willard ................................. 328/137 |
| 4,279,151 | 7/1981 | Anderson ............................... 73/343 |
| 4,475,823 | 10/1984 | Stone ..................................... 374/1 |
| 4,727,359 | 2/1988 | Yuchi et al. ...................... 340/870.17 |
| 4,783,659 | 11/1988 | Frick .................................. 340/870.17 |
| 4,841,286 | 6/1989 | Kummer ................................ 340/653 |
| 4,882,564 | 11/1989 | Monroe et al. .................... 340/870.17 |
| 5,051,743 | 9/1991 | Orszulak ............................ 340/870.17 |
| 5,235,527 | 8/1993 | Ogawa et al. ......................... 340/653 |
| 5,294,890 | 3/1994 | Hemminger et al. .................. 340/652 |
| 5,319,576 | 6/1994 | Iannadrea .......................... 340/870.17 |
| 5,350,237 | 9/1994 | Hida ...................................... 340/584 |

*Primary Examiner*—Jeffery Hofsass
*Assistant Examiner*—Andrew Hill
*Attorney, Agent, or Firm*—Westman, Champlin & Kelly, P.A.

[57] ABSTRACT

A temperature transmitter in a process control system includes a temperature sensor which senses temperature and provides a sensor output related to sensed temperature. An analog-to-digital converter coupled to the sensor output provides a digitized output related to the sensor output. A microprocessor receives the digitized output, compensates the digitized output and provides a temperature output. Comparison circuitry compares the sensor output to a first threshold and provides an inhibit signal to the microprocessor if the sensor is outside of the first threshold.

21 Claims, 3 Drawing Sheets

OPEN SENSOR DIAGNOSTIC SYSTEM FOR TEMPERATURE TRANSMITTER IN A PROCESS CONTROL SYSTEM

This is a File Wrapper continuation of application Ser. No. 08/465,684, filed Jun. 6, 1995, abandoned.

BACKGROUND OF THE INVENTION

The present invention relates to transmitters used in process control systems. More specifically, the present invention relates to a diagnostic technique for identifying an open sensor condition in a temperature transmitter.

Process control transmitters are used to measure process parameters in a process control system. Microprocessor-based transmitters include a sensor, an analog-to-digital converter for converting an output from a sensor into a digital format, a microprocessor for compensating the digitized output and an output circuit for transmitting the compensated output. Typically, this transmission is over a process control loop, such as a 4-20 mA current loop. One example parameter is temperature which is sensed by measuring the resistance of an RTD (Resistive Temperature Device), also called a PRT (Platinum Resistance Thermometer) sensor, or a voltage output of a thermocouple sensor.

Temperature is measured by converting the sensor output (resistance or voltage) to an output indicative of temperature of the sensor. However, one problem occurs when there is a loose connection between the sensor and the input to the transmitter. The number of sampling periods of the analog-to-digital conversion is finite, and an intermittent open circuit can occur during any of the sampling periods which is averaged out over the rest of the sampling periods, an intermittent connection can be hidden within a sampling period. Thus, the system software cannot reliably detect an intermittent sensor connection. Any connection which is open for a duration which is less than the sampling period may go undetected by the microprocessor and lead to inaccurate temperature readings.

SUMMARY OF THE INVENTION

A temperature transmitter in a process control system includes a temperature sensor providing a sensor output related to a sensed temperature and an analog-to-digital converter coupled to the sensor output. The analog-to-digital converter provides a digitized output related to the sensor output. A microprocessor coupled to the digitized output compensates the digitized output and provides a temperature output. Comparison circuitry compares the sensor output to a first threshold and provides an inhibit signal to the microprocessor if the sensor output is outside of the first threshold. In one embodiment, the microprocessor recognizes the inhibit signal as a fault and provides a warning output. A second threshold can be used and the comparison circuitry determines whether the sensor output is within the boundaries of the first and second thresholds. The response time of the comparison circuitry is faster than the response time of the analog-to-digital converter.

DETAILED DESCRIPTION OF THE PREFERRED EMBODIMENTS

Figure 1A:
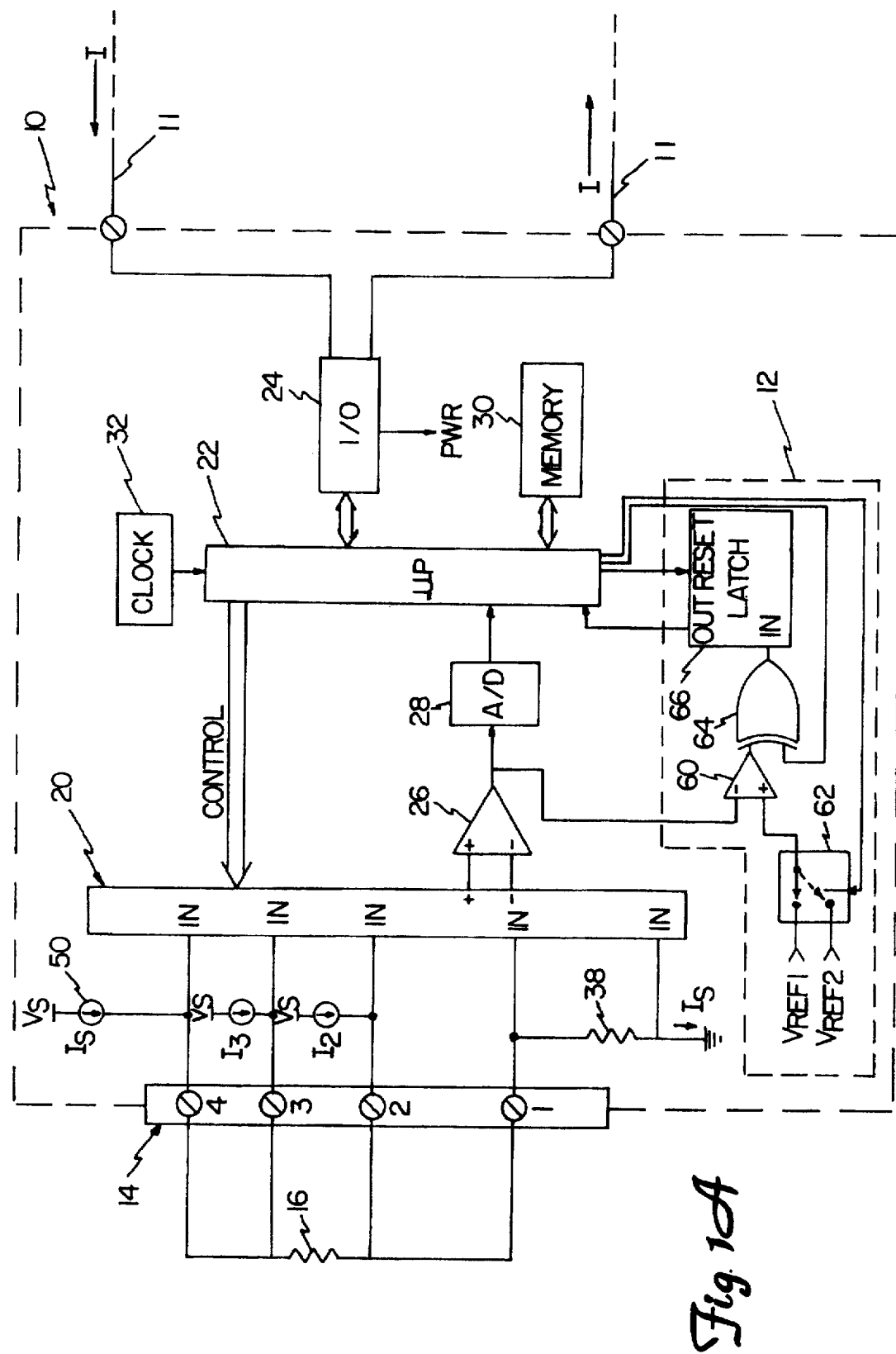
FIG. 1A is a block diagram of a temperature transmitter connected to measure temperature with an RTD sensor, in accordance with one embodiment.

FIG. 1A is a block diagram of temperature transmitter 10 connected to measure temperature with an RTD sensor. Temperature transmitter 10 includes open sensor diagnostic circuitry 12, in accordance with the invention. As described below, circuitry 12 monitors the temperature sensor of transmitter 10 and provides an output upon detection of an open sensor condition. Circuitry 12 is capable of detecting a momentary open circuit condition having a duration which would typically not be detectable by transmitter 10. This information is used by transmitter 10 to diagnose an open circuit condition. For example, a temperature measurement obtained by transmitter 10 in which there is a momentary open circuit can be ignored to avoid inaccurate temperature measurements Transmitter 10 couples to process control loop 11 which provides power to transmitter 10 and over which information is transmitted and received. Transmitter 10 includes terminal block 14 having terminals 1 through 4 for coupling to, for example, an RTD temperature sensor 16 or a thermocouple temperature sensor 18 (shown in FIG. 1B). FIG. 1A shows the electrical connections to RTD 16. Sensor 16 (and sensor 18) can be either internal or external to transmitter 10. Transmitter 10 includes multiplexer 20 controlled by microprocessor 22 which is coupled to control loop 11 through input/output (I/O) circuitry 24. Multiplexer 20 multiplexes appropriate sets of analog signals, including signals from terminals 1 through 4, to positive and negative inputs of differential amplifier 26, which connects to high accuracy A/D converter 28. In one embodiment, converter 28 has an accuracy of 17 bits and a conversion rate of 14 samples/second. Memory 30 stores instructions and information for microprocessor 22, which operates at a speed determined by clock 32. Multiplexer 20 selectively connects input pairs to the positive and negative inputs of differential amplifier 26. A reference resistance $R_{REF}$ 38 couples to multiplexer 20 and is connected in series with RTD 16.

In operation, transmitter 10 measures temperature of sensor 16 and transmits a representation of temperature over control loop 11. Transmitter 10 employs the following equation to compute the major value of temperature of RTD 16:

$$R_{INPUT} = \frac{V_{RINPUT}}{V_{RREF}} (R_{REFNOM}) \qquad \text{Equation 1}$$

where:

$R_{REFNOM}$ the nominal resistance of the reference resistance in ohms, and/or stored in memory 30;

$V_{RINPUT}$ voltage drop across the input; and $V_{RREF}$ voltage drop across $R_{REF}$.

Current source 50 provides current $I_S$ through sensor 16 (via terminals 1 and 4) and reference resistor 38. Microprocessor 22 measures the voltage drop ($V_{RINPUT}$) across RTD 16 between terminals 2 and 3, and the voltage drop ($V_{RREF}$) across resistor 38 with MUX 20. $R_{REFNOM}$ is a calculation constant and is retrieved from memory 30. In a four-wire resistance measurement such as this, the voltage drop across the connections to terminals 2 and 3 is largely eliminated, since substantially all the current flows between terminals 1 and 4, and has little impact on the accuracy of the measurement. $R_{INPUT}$ is converted to temperature units with a look-up table or suitable equation stored in memory 30.

Figure 1B:
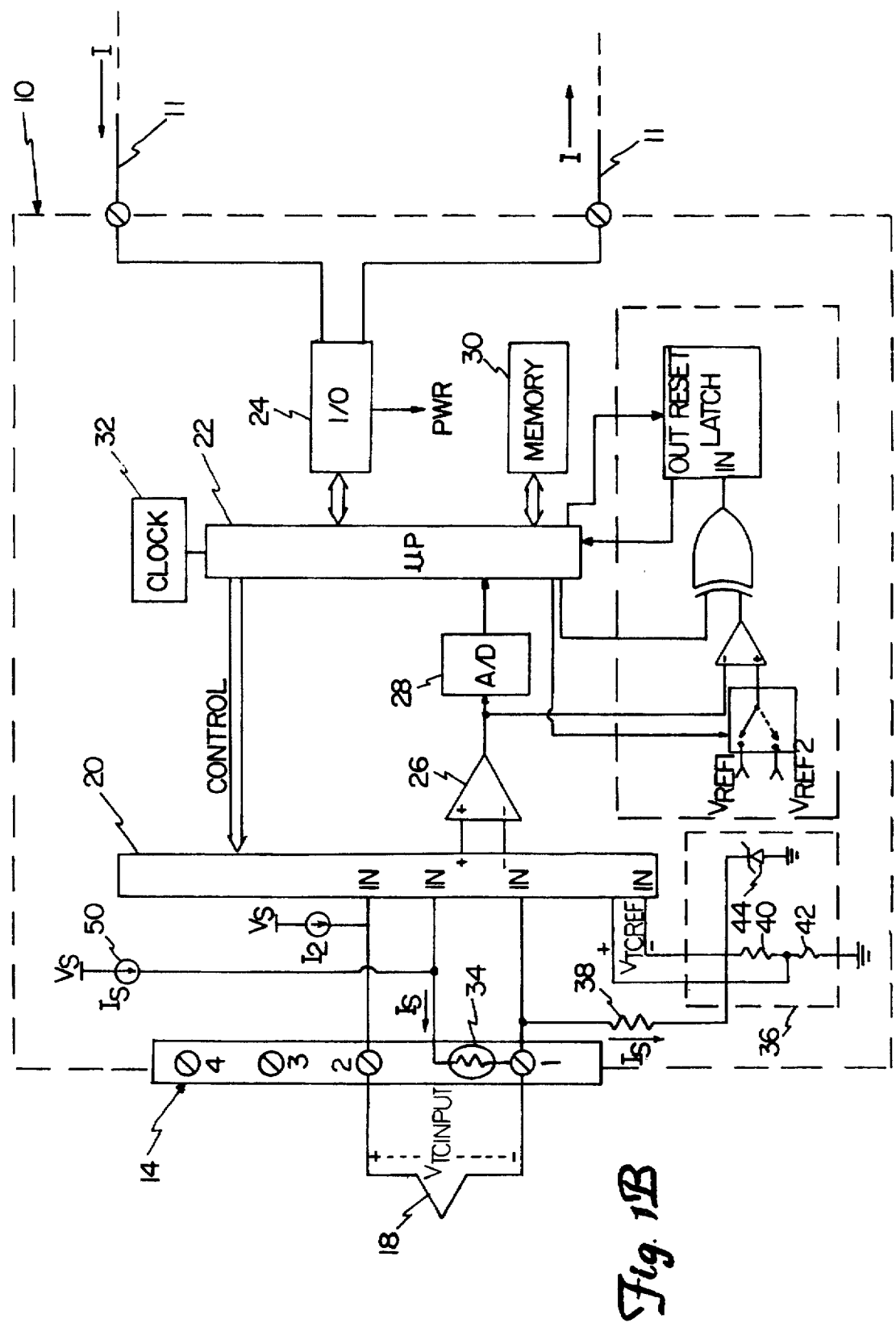
FIG. 1B is a block diagram, like FIG. 1A, of a temperature transmitter connected to measure temperature with a thermocouple sensor.

FIG. 1B shows transmitter 10 connected to measure temperature with thermocouple sensor 18 which creates a voltage $V_{TCINPUT}$ across terminals 1 and 2. Multiplexer 20 couples inputs of differential amplifier 26 to terminals 2 and 1. FIG. 1B shows a voltage reference ($V_{TCREF}$) 36 coupled to MUX 20 and current source 50.

Transmitter 10 measures the temperature of thermocouple sensor 18 by determining the thermocouple voltage $V_{TC}$ with the following equation:

$$V_{TC} = \frac{V_{TCINPUT}}{V_{TCREF}} (V_{TCREFNOM}) \qquad \text{Equation 2}$$

where:

$V_{TCINPUT}$=the measured voltage across terminals 1 and 2 of terminal block 14 sensed by amplifier 26;

$V_{TCREF}$=the measured voltage generated by voltage reference 36 as sensed by amplifier 26;

$V_{TCREFNOM}$=a nominal value of voltage reference 36 stored in memory 30;

However, the junction between two dissimilar metals formed at terminal 1 introduces a cold junction error voltage proportional to the temperature of the junction. The error voltage is sensed by measuring the temperature of the junction at terminal 1 based upon the resistance of a PRT (Platinum Resistance Thermometer) sensor 34 and subsequently using a standard equation or look-up table to determine the cold junction error voltage. Resistance $R_{CJCPRT}$ of sensor 34 is measured using Equation 1 by applying a current $I_S$ from with current source 50. Microprocessor 20 computes $V_{TC}$ according to Equation 2, then effectively subtracts $R_{CJCPRT}$ from $V_{TC}$ using an appropriate look-up table or equation. Then the resulting compensated temperature of sensor 18 is coupled to loop 11 via output circuitry 24.

In the embodiments of FIGS. 1A and 1B, open sensor diagnostic circuitry 12 and current sources $I_S$, $I_2$ and $I_3$ in accordance with the invention are shown. Open sensor diagnostic circuitry 12 includes comparator 60 having an inverting input coupled to the output of differential amplifier 26 or to the outputs of multiplexer 20, and a non-inverting input coupled to switch 62. Switch 62 selectively couples the non-inverting input of comparator 60 to voltage reference $V_{REF1}$ or $V_{REF2}$ under control of microprocessor 22. The output of comparator 60 is provided to exclusive OR (XOR) gate 64. A second input to exclusive OR gate 64 is provided by microprocessor 22. The output of exclusive OR gate 64 is provided to an input of latch 66. Latch 66 also includes a reset input connected to microprocessor 22 and an output connected to microprocessor 22.

In operation, an open sensor condition will cause the output of amplifier 26 or the output of multiplexer 20 to go outside of its normal operating range due to current applied from current sources $I_2$ or $I_3$, either too high or too low. The direction of the output variance depends upon the configuration of the input circuitry as connected through multiplexer 20. Sources $I_2$ and $I_3$ may be, for example, pull-up or pull-down resistors. Microprocessor 22 controls the connection between $V_{REF1}$ and $V_{REF2}$ and comparator 60. Further, microprocessor 22 can invert the output of comparator 60 using exclusive OR gate 64.

Depending upon the type of reading being taken through multiplexer 20 and the direction of current sources $I_S$, $I_2$ and $I_3$, microprocessor 22 is programmed to recognize a reading which is outside of a normal operating range. For example, in Equation 1 microprocessor 22 can monitor the measurements $V_{RINPUT}$ or $V_{RREF}$. Similarly, microprocessor 22 can monitor the voltage across sensor terminals 1 and 2 to sense if sensor lead 2 is open, or can monitor voltage across sensor terminals 1 and 3 to sense if sensor lead 3 is open. Similarly, microprocessor 22 can monitor $V_{TCINPUT}$ or $V_{TCREF}$. For example, if, for any one sensor lead, an open connection would cause the output of amplifier 26 to go above a normal operating range, microprocessor 22 operates switch 62 to connect the appropriate reference level to comparator 60. This would result in a sensor open circuit condition causing the output of comparator 60 to go to a logic LOW. In one embodiment, the input to exclusive OR gate 64 is set so that the exclusive OR gate inverts the signal to a HIGH level to signal microprocessor 22 of the sensor failure. In one embodiment, microprocessor 22 also controls current sources $I_2$ and $I_3$ and selectively couples them to terminals 2 and 3, respectively, during a diagnostic cycle.

Latch 66 is connected to the output of exclusive OR gate 64 and is used to latch the output of exclusive OR gate 64. For example, if the open sensor or open sensor lead is a momentary "glitch" which occurs during a period which is less than the sampling period of analog-to-digital converter 28, the sensor failure signal provided by gate 64 is latched in latch 66 and provided to microprocessor 22. This signals microprocessor 22 that there was an open sensor condition during the sampling time period. Microprocessor 22 provides a reset signal to latch 66 which resets the output of latch 66.

Figure 2:
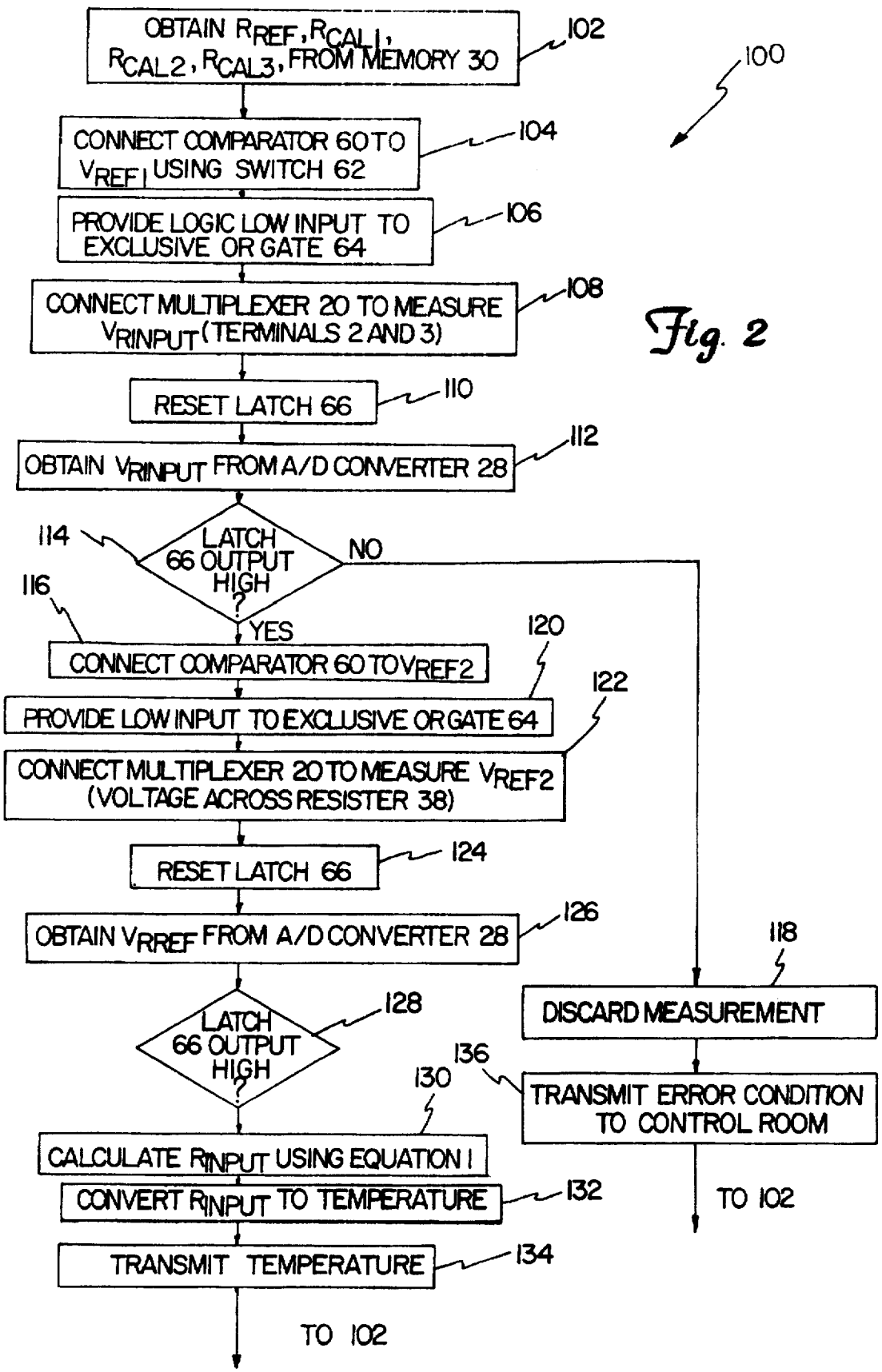
FIG. 2 is a flow chart showing steps performed by a microprocessor in accordance with one embodiment of the invention.

FIG. 2 is a flow chart 100 showing operation of microprocessor 22 in the embodiment of FIG. 1A. Operation of microprocessor 22 is in accordance with instructions stored in memory 30. Microprocessor 22 recalls $R_{REFNOM}$ from memory 30 at flow chart block 102. At block 104, microprocessor 22 controls switch 62 to connect the non-inverting input of comparator 60 to the voltage reference $V_{REF1}$. Next, microprocessor 22 provides a high input to exclusive OR gate 64. Microprocessor 22 controls multiplexer 20 to connect terminals 2 and 3 of terminal block 14 to the inputs of differential amplifier 26 at flow chart block 108. This allows measurement of $V_{RINPUT}$. At Control block 110, microprocessor 22 resets latch 66. $V_{RINPUT}$ is measured at block 112 by microprocessor 22 using analog-to-digital converter 28. After obtaining $V_{RINPUT}$, microprocessor 22 observes the output of latch 66 at block 114. A HIGH output from latch 66 indicates that the voltage across terminals 2 and 3 of terminal block 14 exceeded a predetermined maximum determined by $V_{REF1}$ during analog-to-digital conversion by converter 28. If latch 66 provides a HIGH output, control is passed to block 116, otherwise control is passed to block 118 where the measurement of $V_{RREF}$ begins. $V_{REF2}$ is connected to comparator 60 by microprocessor 22 using switch 62. At block 120, a logic LOW is provided to an input of exclusive OR gate 64.

Next, at block 122, microprocessor 22 controls multiplexer 20 to measure $V_{REF}$ which is the voltage across resistor 38. At block 124, latch 66 is reset by microprocessor 22 and microprocessor 22 reads $V_{REF}$ from analog-to-digital converter 28 at block 126. After reading $V_{REF}$, microprocessor 22 observes the output of latch 66 at block 128. If the latch output is HIGH, microprocessor 22 determines that an error has occurred and control is passed to block 116. If there is no error, control moves to block 130 where $R_{INPUT}$ is calculated in accordance with Equation 1. At block 132, $R_{INPUT}$ is converted to temperature by means of an algorithm or a look-up table stored in memory 30 and its value is transmitted at block 134. Following transmission, the process is repeated and control is returned to block 102. In a similar manner also, diagnostics are done periodically on leads 2 and 3 also using $I_2$ and $I_3$ currents. Typically, all leads are scanned every time a total sensor update occurs.

If the output of latch 66 indicates the occurrence of an error, control is passed to block 116. At block 116, the value obtained from analog-to-digital converter 28 is discarded. At block 136, microprocessor 22 transmits a signal over loop 11 using IO circuitry 24 which indicates the occurrence of an error. Control is then returned to block 102 and the process is repeated.

A monitor in the control room can monitor operation of transmitter 10 and detect error signals sent from transmitter 10. If transmitter 10 is repeatedly sending error signals, the monitor in the control room can use this information to alert an operator that there is an open sensor condition at transmitter 10. Additionally, if errors occur only periodically, the operator can be notified that there may be an impending problem with the sensor in transmitter 10. Intermittent errors can also be latched in the microprocessor software to provide a continuous alarm.

The loose sensor connection diagnostic for the embodiment of FIG. 1B operates similar to that described above for FIG. 1A, and Equations 2 and 3 are employed to determine temperature.

It will be recognized by those skilled in the art that the circuitry set forth in the present invention may be modified as appropriate. For example, multiple circuits could be employed to simultaneously detect if the output voltage is above or below certain thresholds. Further, more than two voltage references may be used. In another example, the voltage reference could be controlled by the microprocessor using a digital-to-analog converter such that the microprocessor can independently select the voltage threshold.

Although the present invention has been described with reference to preferred embodiments, workers skilled in the art will recognize that changes may be made in form and detail without departing from the spirit and scope of the invention. For example, the comparison circuit can be connected at any appropriate location, such as between the multiplexer and the differential amplifier.

What is claimed is:

1. A temperature transmitter in a process control system, comprising:

a temperature sensor sensing a temperature and providing a sensor output related to a sensed temperature;

an A/D converter coupled to the sensor output providing a digitized output related to the sensor output;

a microprocessor coupled to the digitized output which compensates and processes the digitized output and provides a temperature output; and comparison circuitry which compares the sensor output to a first threshold and provides an inhibit signal to the microprocessor if the sensor output is outside of the first threshold.

2. The temperature transmitter of claim 1 wherein the sensor output includes a plurality of sensor leads which are individually coupled to the comparison circuitry through a multiplexer.

3. The temperature transmitter of claim 1 wherein the comparison circuitry compares the sensor output to a second threshold and provides the inhibit signal if the sensor output is outside the first and second thresholds.

4. The temperature transmitter of claim 2 including a switch connected to the first and second thresholds and an input to the comparison circuitry connecting the first or second thresholds to the comparison circuitry input in response to a control signal from the microprocessor.

5. The temperature transmitter of claim 1 wherein the microprocessor is coupled to the inhibit signal and the inhibit signal inhibits the temperature output.

6. The temperature transmitter of claim 1 wherein the comparison circuitry has a faster response time than a response time of the A/D converter.

7. The temperature transmitter of claim 1 wherein the comparison circuitry includes a polarity control input for selectively inverting the inhibit output.

8. The temperature transmitter of claim 7 wherein the polarity control input is coupled to the microprocessor.

9. The temperature transmitter of claim 1 including output circuitry coupled to a two-wire process control loop which transmits the temperature output on the process control loop.

10. The temperature transmitter of claim 1 wherein the sensor is an RTD.

11. The temperature transmitter of claim 1 wherein the sensor is a thermocouple.

12. The temperature transmitter of claim 1 wherein the microprocessor is coupled to the inhibit signal and responsively provides a diagnostic output.

13. A method of measuring temperature of a process in a process control system, comprising the steps of:

obtaining a sensor input related to temperature of the process;

providing a digitized output related to the sensor output;

compensating the digitized output and providing a compensated output indicative of temperature of the process;

comparing the first sensor input with a threshold; and providing an error signal based upon the comparison.

14. The method of claim 13 including inhibiting the compensated output in response to the error signal.

15. The method of claim 13 including:

comparing the sensor input with a second threshold; and providing the error signal based upon the comparison with the second threshold.

16. The method of claim 13 including adjusting the first threshold based upon a type of sensor which provides the sensor input.

17. The method of claim 13 wherein the step of comparing is faster than the step of providing the digitized output.

18. The method of claim 13 including transmitting the compensated output over a two-wire process control loop.

19. The method of claim 13 including selectively inverting the polarity of the error signal.

20. The method of claim 13 wherein the sensor input includes a plurality of sensor leads, the method including individually comparing a sensor input from each sensor lead with a threshold.

21. The method of claim 13 including providing a diagnostic output in response to the error signal.

* * * * *